United States Patent
Quioc

(10) Patent No.: US 9,623,834 B1
(45) Date of Patent: Apr. 18, 2017

(54) FILTERLESS DUAL-STAGE INFLATOR WITH BAFFLE SYSTEM

(71) Applicant: TK Holdings Inc., Armada, MI (US)

(72) Inventor: Eduardo L. Quioc, Westland, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 14/293,590

(22) Filed: Jun. 2, 2014

Related U.S. Application Data

(60) Provisional application No. 61/829,989, filed on May 31, 2013.

(51) Int. Cl.
*B60R 21/26* (2011.01)
*B60R 21/264* (2006.01)

(52) U.S. Cl.
CPC ............ *B60R 21/264* (2013.01); *B60R 21/26* (2013.01); *B60R 2021/2642* (2013.01)

(58) Field of Classification Search
CPC ... B60R 21/26; B60R 21/264; B60R 21/2644; B60R 2021/2642; B60R 2021/2644
USPC ............................ 102/530, 531; 280/736, 741
See application file for complete search history.

(56) References Cited

U.S. PATENT DOCUMENTS

| | | | | |
|---|---|---|---|---|
| 5,149,129 A | * | 9/1992 | Unterforsthuber | F42B 3/04 280/736 |
| 5,268,013 A | * | 12/1993 | Bruncher | B01D 46/24 280/741 |
| 7,178,830 B2 | * | 2/2007 | Blackburn | B60R 21/2644 280/736 |
| 7,267,365 B2 | * | 9/2007 | Quioc | B60R 21/2644 280/736 |
| 7,527,291 B2 | * | 5/2009 | Young | B60R 21/268 280/737 |
| 7,806,954 B2 | * | 10/2010 | Quioc | B60R 21/2644 102/202.14 |

FOREIGN PATENT DOCUMENTS

DE 4121039 A1 * 1/1993 ............ B60R 21/261
DE 4302111 C1 * 6/1994 ......... B60R 21/2644

* cited by examiner

*Primary Examiner* — James S Bergin
(74) *Attorney, Agent, or Firm* — Meunier Carlin & Curfman LLC

(57) ABSTRACT

A gas generating system is provided. The system includes a housing and a first baffle element positioned within the housing. The first baffle element includes a base portion and a wall extending from the base portion in a first direction. A second baffle element is positioned within the housing and includes a base portion, a first wall extending from the base portion in a second direction, and a second wall extending from the base portion in the second direction. The first baffle element wall extends between and is spaced apart from the second baffle element first and second walls.

15 Claims, 8 Drawing Sheets

SECTION 2-2

FILTERLESS DUAL-STAGE INFLATOR WITH BAFFLE SYSTEM

CROSS-REFERENCE TO RELATED APPLICATIONS

This application claims the benefit of U.S. Provisional Application Ser. No. 61/829,989, filed on May 31, 2013, the disclosure of which is incorporated herein by reference in its entirety.

BACKGROUND OF THE INVENTION

The embodiments of the present invention relate to gas generating systems used to provide gases for gas-actuatable devices incorporated into, for example, a vehicle occupant protection system.

SUMMARY OF THE INVENTION

In one aspect of the embodiments described herein, a gas generating system is provided. The system includes a housing and a first baffle element positioned within the housing. The first baffle element includes a base portion and a wall extending from the base portion in a first direction. A second baffle element is positioned within the housing and includes a base portion, a first wall extending from the base portion in a second direction, and a second wall extending from the base portion in the second direction. The first baffle element wall extends between and is spaced apart from the second baffle element first and second walls.

DETAILED DESCRIPTION

Figure 1:
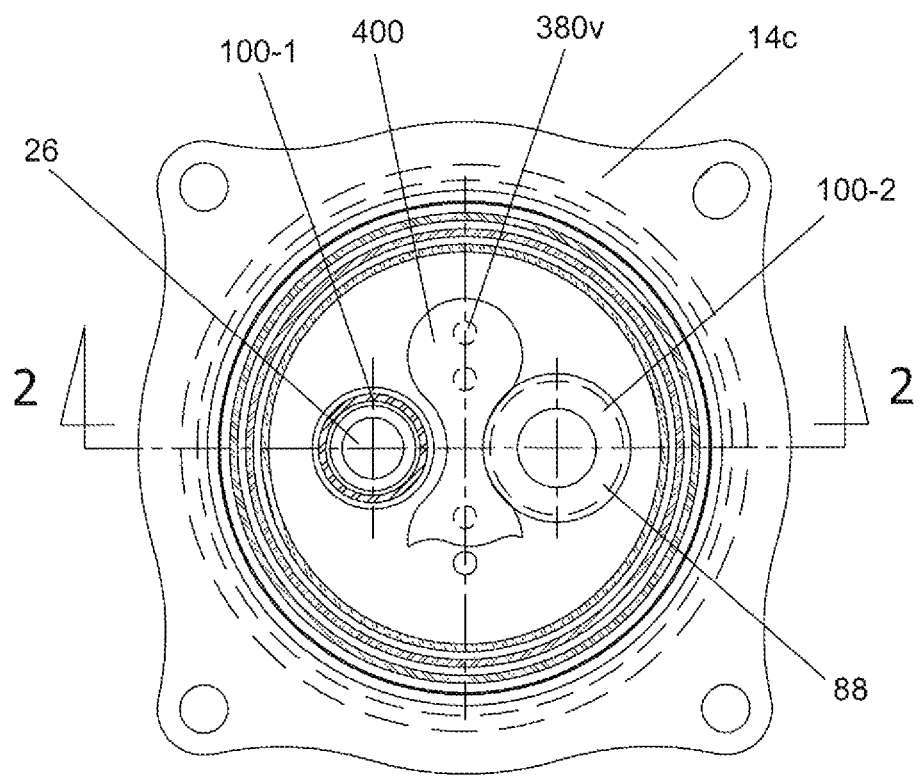
FIG. 1 is a cross-sectional plan view of a portion of one embodiment of a gas generating system.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

FIGS. 1-6 show cross-sectional views of a gas generating system 10 in accordance with one embodiment of the present invention. In the embodiment shown, gas generating system 10 is a dual-stage gas generating system including two separate, independently activatable combustion chambers, a primary chamber 24 and an optional dependent or secondary combustion chamber 82. Depending on the amount of gas required for a particular application, chamber 24 may be deployed alone, or chambers 24 and 82 may be deployed sequentially to inflate or otherwise actuate an associated gas-actuatable device. In another operational mode, both of chambers 24 and 82 are deployed simultaneously.

Gas generating system 10 includes a generally cylindrical housing 12 having a first portion 13 and a second portion 14 attached to the first portion. In the embodiment shown, system 10 is configured as a driver side inflator, with first portion 13 comprising a cap and second portion 14 comprising a base. Cap 13 includes a base portion 13a and a wall 13b extending from the base portion to define a first, primary chamber 24 suitable for receiving therein various components of the gas generating system. Base 14 includes a base portion 14a, a wall 14b extending from the base portion, and one or more flanges 14c extending outwardly from an end of wall 14b. Second housing portion 14 also has a pair of openings 14d and 14e formed therein to enable the mounting of initiators 26 and 88 in the housing for initiating combustion of gas generant materials positioned in the housing, as described below.

In the embodiment shown, a plurality of openings 20 are formed along first portion wall 13b to permit fluid communication between an interior of the housing and an associated airbag or other gas-actuatable device (not shown). Openings 20 may be covered with a foil or shim 56 formed from a material such as aluminum or stainless steel to prevent the incursion of water vapor into gas generating system housing 12 prior to activation of the system. In one embodiment, the foil 56 (sometimes referred to as "burst foil") is of a thickness in the range of about 0.01 to about 0.20 mm. The foil 56 may be adhered to an interior surface of the gas generating system housing through the use of an adhesive.

First and second housing portions 13 and 14 may be cast, stamped, extruded, molded or otherwise formed from a metallic material or other suitable material or materials.

A first baffle element 90 is welded or otherwise secured to first housing portion 13. In the embodiment shown, first baffle element 90 has a base portion 90a and a cylindrical wall 90b extending from a periphery of base portion 90a in a first direction to define a cavity 90c therebetween. In a particular embodiment, the first baffle element is attached to the first housing portion so that base portion 90a extends along and is in intimate thermal contact with base portion 13a of first housing portion 13. Thermal contact between base portion 90a and base portion 13a may be enhanced by, for example, maximizing the surface area over which these features are in physical contact with each other, specifying the surface finishes of the contacting surfaces so as to minimize asperities, maximizing the contact forces between the surfaces prior to securing the surfaces together, and otherwise facilitating intimate contact between the surfaces. Such measures are designed to help ensure that heat from an external heat source (such as an open flame exterior of and impinging upon first housing portion 13) is efficiently and rapidly transferred through the first housing portion 13 to the first baffle element 90, then through the first baffle element 90 to an auto-igniting booster material positioned in booster cup 25 and in physical contact with base portion 90a.

The first baffle element is affixed to the first housing portion in a position such that a constant spacing is maintained between baffle element wall 90b and first housing portion wall 13b along the extent of wall 90b. An annular cavity 300e is thus formed between walls 13b and 90b. The first baffle element may be cast, stamped, extruded, molded, formed or otherwise formed from a metallic material or other suitable material or materials.

A second baffle element 92 has a base portion 92a, a first wall 92b extending from the base portion in a second direction opposite the first direction, and a second wall 92c extending from the base portion in the second direction so as to define an annular cavity 92d between the base portion 92a, wall 92b and wall 92c. Inner wall 92c also defines a cavity or enclosure 92e therein. In the particular embodiment shown in FIGS. 2-5, base portion 92a has the shape of a hollow half-torus, with each of walls 92b and 92c extending from an associated one of a first end 93 and a second end 94 of the half-circular toroidal section. However, the second baffle element base portion may have any of a variety of alternative shapes.

Figure 2:
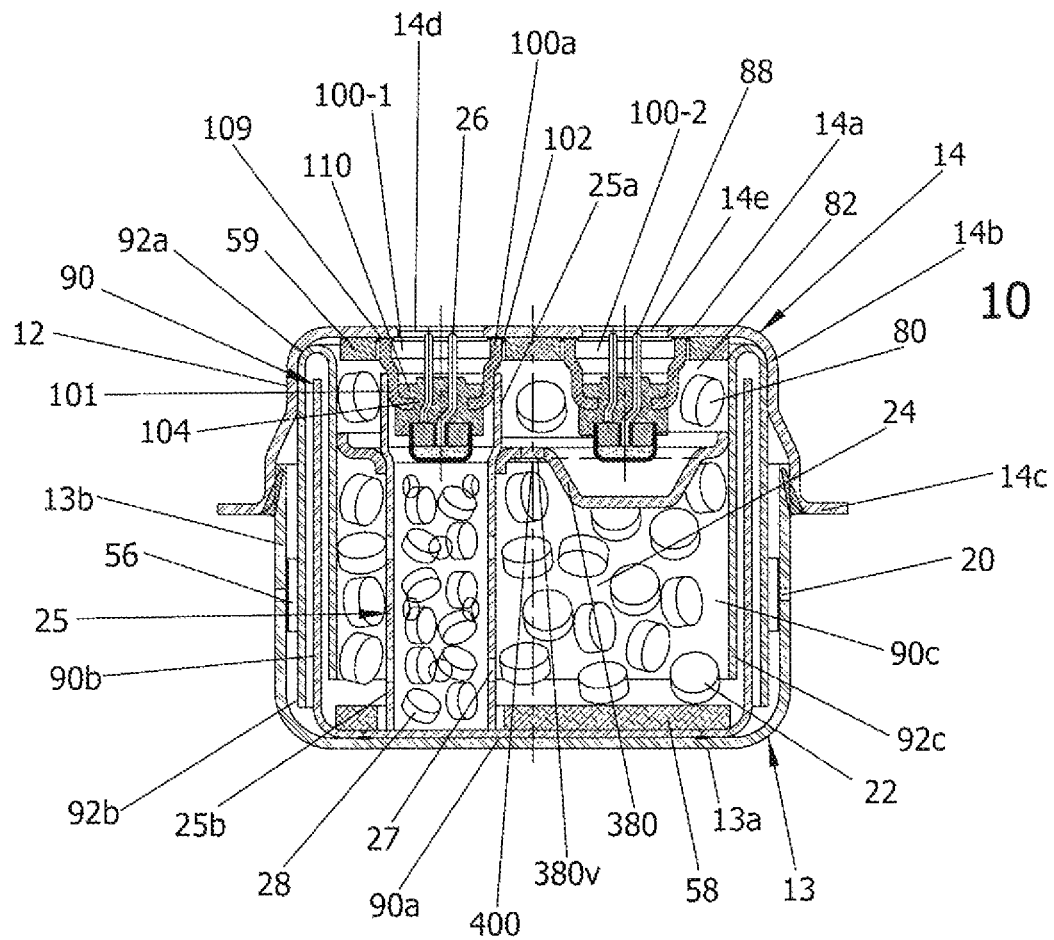
FIG. 2 is a side cross-sectional view of the gas generating system shown in FIG. 1.
Figure 3:
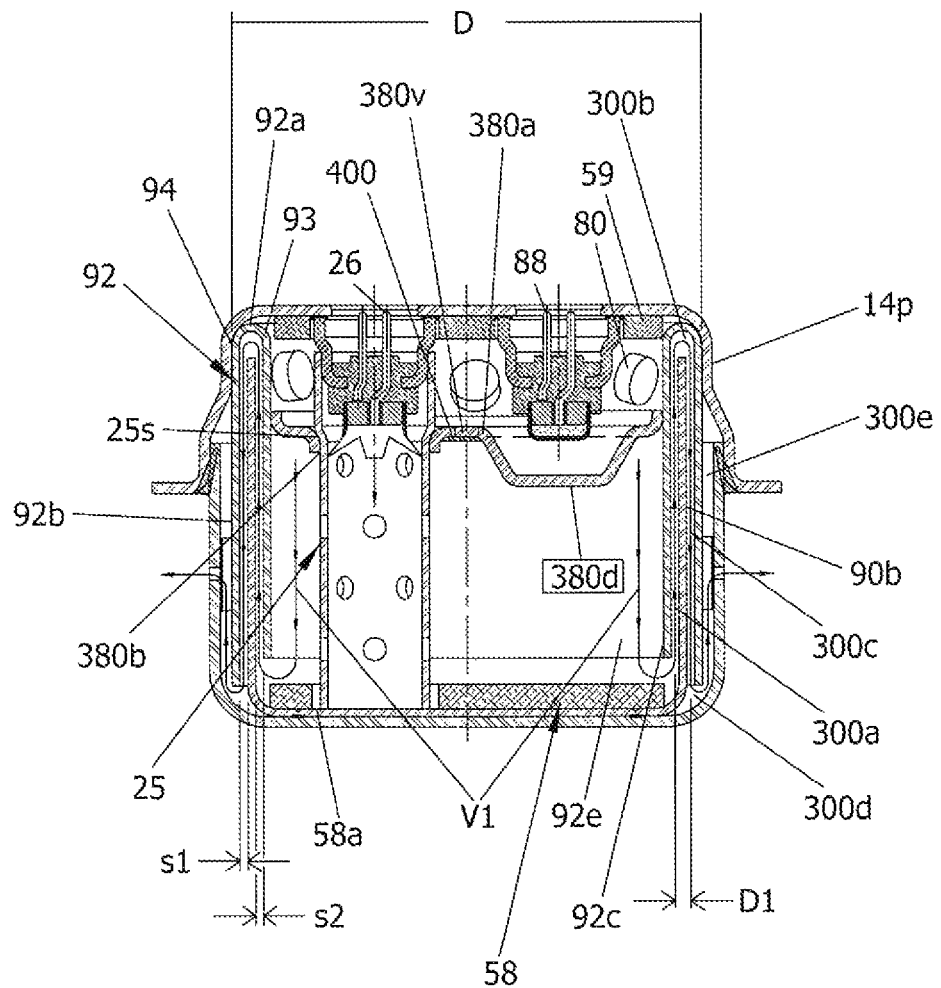
FIG. 3 is the view of FIG. 2 showing activation and operation of a primary chamber of the gas generating system.

In the embodiment shown in FIGS. 1-6, walls 92b and 92c extend parallel to each other. However, either of walls 92b and 92c may have any desired configuration and/or extend in any desired direction, according to the requirements of a particular application. Walls 92b and 92c are spaced apart a distance D1 specified so as to permit first baffle element wall 90b to be inserted therebetween during assembly of the gas generating system, and so as to provide a predetermined minimum spacing s1 between walls 90b and 92b and a predetermined minimum spacing s2 between walls 90b and 92c as shown in FIG. 3. This forms a fluid flow passage 300 having a first portion 300a extending between walls 92c and 90b, a second portion 300b extending between base portion 92a and an end or edge of wall 90b, a third portion 300c extending between walls 90b and 92b, and a fourth portion extending between an end or edge of wall 92b and first housing portion 13. A fifth portion 300e of the flow passage extends between wall 92b and housing first portion wall 13b. In a particular embodiment, spacings s1 and s2 are equal. Also, as seen in the drawings, second baffle element wall 92c, divider 380, first baffle element base portion 90a, and first baffle element wall 90b combine to define primary combustion chamber 24.

In the embodiment shown in FIGS. 1-6, walls 92b and 92c have different lengths extending from base portion 92a, with wall 92c being shorter than wall 92b. However, either wall may have any desired length, according to the requirements of a particular application. Referring to FIG. 3, a diameter or other outermost dimension D of the second baffle element along base portion 92a is dimensioned so as to form an interference fit with a portion 14p of second housing portion 14 when the first baffle element is inserted into the second housing portion as shown in FIGS. 1-5. In a particular embodiment, a portion of wall 92b also forms an interference fit with housing portion 14p. This construction aids in providing intimate thermal contact between the first baffle element 90 and second housing portion 14. Thermal contact between first baffle element 90 and second housing portion 14 may be enhanced by, for example, maximizing the surface area over which these features are in physical contact with each other, specifying the surface finishes of the contacting surfaces so as to minimize asperities, maximizing the contact forces between the surfaces prior to securing the surfaces together, and otherwise facilitating intimate contact between the surfaces. Such measures are designed to help ensure that heat from an external heat source (such as an open flame exterior of and impinging upon second housing portion 14) is efficiently and rapidly transferred through the second housing portion 14 to the first baffle element 90, then through the first baffle element 90 to an auto-igniting booster material positioned in booster cup 25 and in physical contact with base portion 90a. The second baffle element may be cast, stamped, extruded, molded, formed or otherwise formed from a metallic material or other suitable material or materials.

Referring to FIGS. 1-6, gas generating system 10 also includes a first initiator or igniter 26 positioned so as to enable fluid communication between the initiator and a booster composition or other ignitable material upon activation of the gas generating system, for initiating combustion of a gas generant composition 22 in a manner known in the art. In the embodiment shown in FIGS. 2 and 6, an end of initiator 26 extends from solidified mold material 110 into a booster chamber formed by a booster cup 25 incorporated into the gas generating system. In embodiment of the gas generating system described herein, the initiator 26 is incorporated into an initiator assembly 100-1 which is, in turn, incorporated into the base assembly 10. One example of an initiator suitable for use in the gas generating system of the present invention is described in U.S. Pat. No. 6,009,809, incorporated herein by reference.

Referring to FIGS. 1-6, initiator assembly 100-1 includes a collar 100a and initiator 26 molded to the collar using a flowable molding material 110 as described below. Collar 100a includes a base portion 101 and an annular wall 102 extending from and along a periphery of the base portion to define a cavity 103 therebetween. A portion of wall 102 is stepped at 102a to provide a bearing surface against which an end of a booster cup may be positioned and secured. An opening 104 is formed in collar base portion 101 and is structured for receiving a portion of initiator 26 therethrough prior to execution of the molding operation. The very end or edge 109 of collar wall 102 may include features (such as projections or raised surfaces) formed therealong to facilitate welding of the end of the collar wall to gas generating system base 14, in a manner described below.

In the embodiment shown in FIGS. 1-6, the molding material 110 forms a single, continuous mass extending along a first side 101a of the collar base portion, through opening 104, and along a second side 101b of the collar base portion. As this mass contacts both sides of the collar base portion and also contacts the walls of the base portion along opening 104, the molding material 110 forms a plug which is firmly fixed in position with respect to collar 100a. The solidified molding material also acts to form a gas-tight seal between the collar and the initiator.

"Molding" of the initiator into the collar as described herein is understood to mean that a flowable molding material, adhesive material, or other material having a viscosity suitable for injecting, pouring, or otherwise inserting into the housing is introduced into the housing interior to occupy a space between the initiator and the collar, after the initiator has been positioned and secured for purposes of the molding operation. Thus, the collar 100a and initiator 26 form a portion of the mold. The molding material in contact with the collar, initiator, and the remainder of the mold in which the collar and initiator are positioned prior to molding then hardens or solidifies to encase a portion of the initiator and to secure the initiator to the collar.

In the embodiments disclosed herein, molding materials for securing the initiator(s) to the base assembly may be selected based on such factors as desired fabrication methods, system operational requirements, and other pertinent factors. Materials such as polymers, pourable and injectable adhesives and potting compounds, and/or any other suitable materials may be used. Molding parameters such as pressure and temperature may be iteratively determined based on such factors as the molding materials and methods selected, the structure of the mold into which the molding material is to be inserted, and other pertinent factors.

Figure 6:
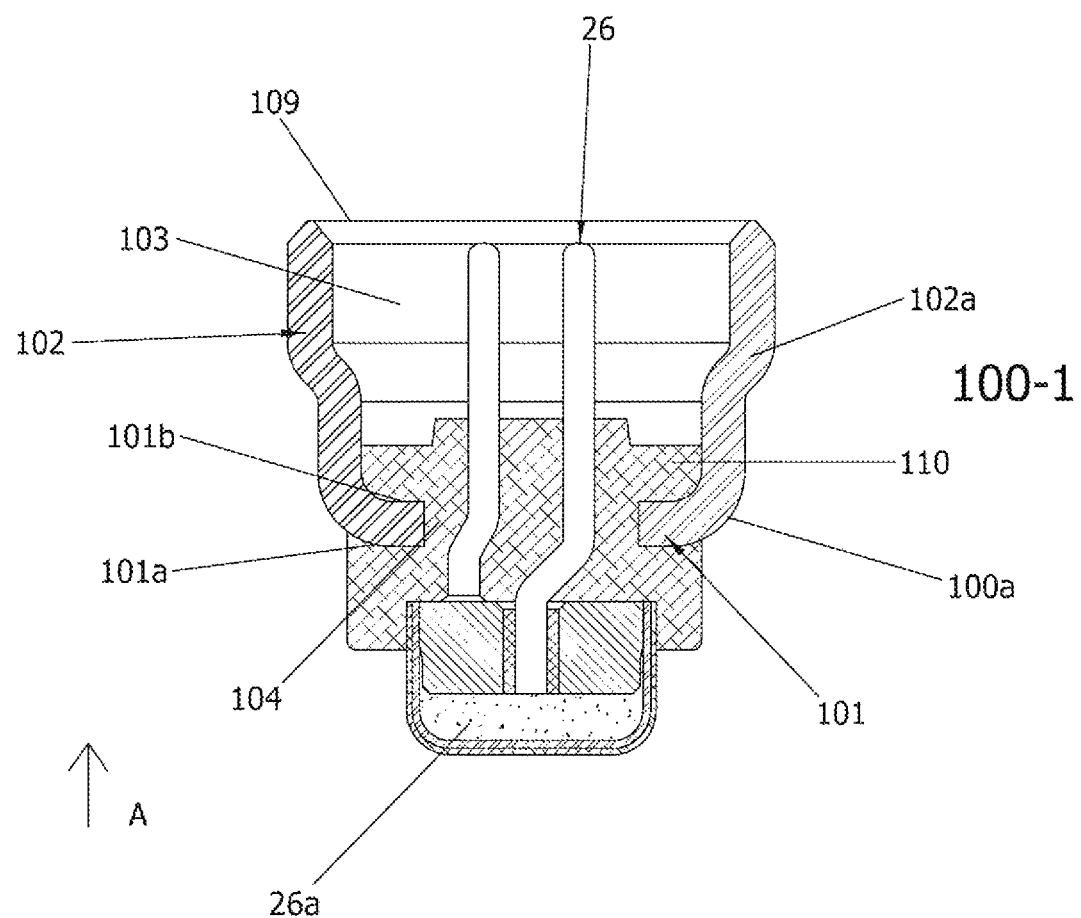
FIG. 6 is a cross-sectional view of one embodiment of a molded initiator assembly usable in the gas generating system of FIG. 2.

Collar opening 104 is sized to be too small to permit a body portion 26a of initiator 26 to pass through the orifice from side 101a of the collar to an opposite side 101b of the collar in the direction indicated by arrow "A" (FIG. 6). This aids in preventing removal or ejection of initiator 26 through orifice 104.

Referring to FIGS. 1-6, gas generating system 10 also includes a second initiator or igniter 88, similar to first initiator 26 and positioned so as to enable fluid communication between the initiator and second gas generant composition 80 positioned within a secondary combustion chamber 82. Second initiator 88 may be incorporated into a second initiator assembly 100-2, in the same manner as previously described with respect to initiator 26. Second initiator assembly 100-2 may then be incorporated into the base assembly 10 as previously described.

FIGS. 1-6 show an embodiment of the base 14 configured for receiving and securing thereon multiple initiator assemblies 100-1 and 100-2, constructed as just described.

An initiator assembly 100-1, 100-2 is attached to base 14 using any suitable procedure. In one embodiment, the initiator assembly 100-1, 100-2 is attached to the base by welding end portion 109 of collar 100a to base along the base portion 14a such that the initiator assembly encloses or covers opening(s) 14d and 14e formed in the base 14. Induction welding or any other suitable process may be used. Welding of the initiator assembly 100-1, 100-2 directly to the base also forms a gas-tight seal between the base and the collar 100a. FIGS. 1-6 show cross sections of embodiments wherein an end portion 109 of a collar wall 102 welded to a base 14.

Referring again to FIGS. 1-6, a quantity of a known or suitable ignition or booster material 28, combustion of which ignites gas generant material 22, may be positioned within housing 12 so as to enable fluid communication between the booster material and gas generant composition 22 upon activation of the gas generating system.

In one embodiment, booster material 28 is a known auto-igniting booster material positioned in housing 12 so as to enable thermal communication with the housing prior to activation of the gas generating system, thereby enabling heat transfer from an exterior of the housing to the auto-igniting booster material using the housing as a heat transfer medium. Ignition of the booster material results in ignition of the gas generant material 22, in a manner known in the art. In an embodiment using an auto-igniting booster material, the booster material is formulated to ignite when it reaches a temperature within a predetermined range. The auto-igniting booster material fulfills the functions of both a conventional booster material and a conventional auto-ignition material, enabling ignition of the gas generant material in cases where the housing 12 is exposed to an elevated external temperature resulting from, for example, a flame. This obviates the need for a separate auto-ignition material.

A cup 25 may be positioned within the gas generating system housing to enclose initiator 26 and to house booster material 28. Cup 25 includes one or more walls 25b to define an interior of the cup. Wall(s) 25b terminate along edge(s) defining an open end 25a of the cup. In the embodiment shown, an open end 25a of the cup is dimensioned to engage a portion of an initiator assembly collar 100a in an interference fit to provide a gas-tight seal between the collar and the booster cup. The cup may also be welded or otherwise attached to the collar to enhance the seal. In addition, cup end 25a abuts step 102a formed along the collar wall 102, to aid in positioning the cup. Openings 27 are formed in wall(s) 25b to enable fluid communication between an interior of the cup and a combustion chamber 24 defined within the housing and containing gas generant material 22 after activation of the gas generating system. Openings 27 enable by-products of combustion of booster material 28 to reach the gas generant material 22. Activation of initiator assembly 100-1 produces combustion of the booster material, thereby effecting ignition of gas generant composition 22 in a manner known in the art.

Cup 25 may be stamped, extruded, cast, formed or otherwise suitably formed and may be made from carbon steel, stainless steel, or any other suitable material. In an embodiment incorporating an auto-igniting booster material, cup base portion 25a may be structured to contact first baffle element 90, and the first baffle portion may be structured to contact cap 13 as shown in FIG. 2, thereby facilitating transfer of heat from an exterior of housing 12 through cap base portion 13a to the auto-igniting booster material inside cup 25. This enables ignition of the auto-igniting booster material when the gas generating system is exposed to flames.

In the embodiment shown in FIGS. 1-6, a step 25s is formed along a portion of cup wall 25b to provide a bearing surface or hard stop for engaging a portion of divider 380 (described in greater detail below). This feature may be used to limit the extent to which the divider 380 may be moved along the length of the booster cup. Alternatively, the cup wall may incorporate multiple steps or other locating features along the length of the cup, to aid in locating the cup in any of several predetermined positions.

A divider 380 is positioned in housing 12 within second baffle element cavity 92e. Divider 380 divides an interior of the second baffle element cavity 92e into primary combustion chamber 24 and secondary combustion chamber 82. Divider 380 has a base portion 380a, an opening 380b formed in the base portion, and a projection 380d extending from the base. At least one vent opening 380v is provided in base portion 380a to enable fluid communication between secondary chamber 82 and primary chamber 24. Projection 380d is dimensioned to form a cavity for accommodate a portion of one of initiators 26 and 88 therein in an embodiment where the divider is located in relatively close proximity to housing second portion 14.

Divider 380 is structured so as to be adjustably positionable within the second baffle element cavity 92e and along a length of booster cup 25. Opening 380 b is dimensioned so as to provide a sliding fit between the edges of the opening and booster cup 25 when the booster cup is inserted into the opening. This permits adjustment of the divider position along a length of the booster cup, which enables the relative volumes of the first and second combustion chambers 24 and 82 to be adjusted over a wide range of values during assembly of the gas generating system. This, in turn, enables the relative sizes of the gas generant charges (i.e., the amount of gas generant material) in each chamber to be varied during assembly, according to the requirements of a particular application.

In one particular embodiment, the ratio of the primary chamber volume to the secondary chamber volume is 90/10. In another particular embodiment, the ratio of the primary chamber volume to the secondary chamber volume is 60/40.

In another particular embodiment, locating and/or positioning features (not shown) are formed along the booster cup 25 and/or the divider 380 to facilitate positioning of the divider along the booster cup at a first position providing a primary-to-secondary chamber volume ratio of 90/10, and also to facilitate positioning of the divider along the booster cup at a first position providing a primary-to-secondary chamber volume ratio of 60/40.

A check valve 400 is provided to control a flow of gas and/or combustion products through divider vent opening(s) 380v. Valve 400 is structured to permit a flow of gas and/or combustion products from secondary chamber 82 into primary chamber 24, but prevent a flow of gas and/or combustion products from primary chamber 24 into secondary chamber 82. This enables activation of either the primary chamber alone or both the primary and secondary chambers, depending on the requirements of a particular application.

In one embodiment, the check valve is in the form of one or more shims (such as a suitable stainless steel shim) affixed to a surface of the divider 380 within chamber 24 so as to cover opening(s) 380v, and so as to be detachable from the divider responsive to a flow of gas and/or combustion products flowing from chamber 82 through opening(s) 380v.

Gas generating system 10 also includes a first inflation fluid source positioned within cavity 92e for releasably storing, generating, or otherwise providing an inflation fluid for inflating an inflatable element (for example, an associated airbag) of a vehicle occupant protection system. In the embodiments shown in FIGS. 1-6, the first inflation fluid source comprises a first gas generant material 22 positioned within primary chamber 24.

Gas generant 22 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232, 6,887,326 and 6,475,312 each incorporated by reference herein. As used herein, the term "smokeless" should be generally understood to mean such propellants as are capable of combustion yielding at least about 90% gaseous products based on a total product mass; and, as a corollary, less than about 10% solid products based on a total product mass. In some embodiments, the need for a filter may be eliminated by using a gas generant material having the above-described combustion characteristics.

Referring again to FIGS. 1-6, a cushion or pad 58 is positioned within first baffle element 90 along base portion 90a. Pad 58 aids in holding the gas generant material 22 in place and/or in cushioning the gas generant against vibration and impact. In order to facilitate heat transfer from the exterior of the housing 12 to an auto-igniting booster material positioned in cup 25, pad 58 may have an opening 58a formed therein to enable booster cup 25 to contact the first baffle element 90, thereby facilitating heat transfer from the exterior of the housing 12 to the auto-igniting booster material. Pad 58 may be formed from, for example, a ceramic fiber material or any other suitable material.

In the embodiments shown in FIGS. 1-6, gas generating system 10 also includes a second inflation fluid source positioned within chamber 82 in fluid isolation from the first inflation fluid source located in chamber 24. The second inflation fluid source is provided in order to supplement the inflation fluid provided by the first inflation fluid source in certain applications of the gas generating system, as described below.

In the embodiments shown in FIGS. 1-6, the second inflation fluid source comprises a second gas generant composition 80 positioned within a secondary combustion chamber 82 defined by divider 380, booster cup 25, housing portion 14, and second baffle element 92. Second gas generant 80 is formulated so as to be ignitable responsive to activation of a second initiator 100-2. Similar to gas generant 22 described above, second gas generant 80 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232, 6,887,326 and 6,475,312, each incorporated by reference herein.

Referring again to FIGS. 1-6, a cushion or pad 59 is positioned within housing second portion 14 along base portion 14a. Pad 59 aids in holding the gas generant material 80 in place and/or in cushioning the gas generant against vibration and impact. Pad 59 may be formed from, for example, a ceramic fiber material or any other suitable material.

Figure 4:
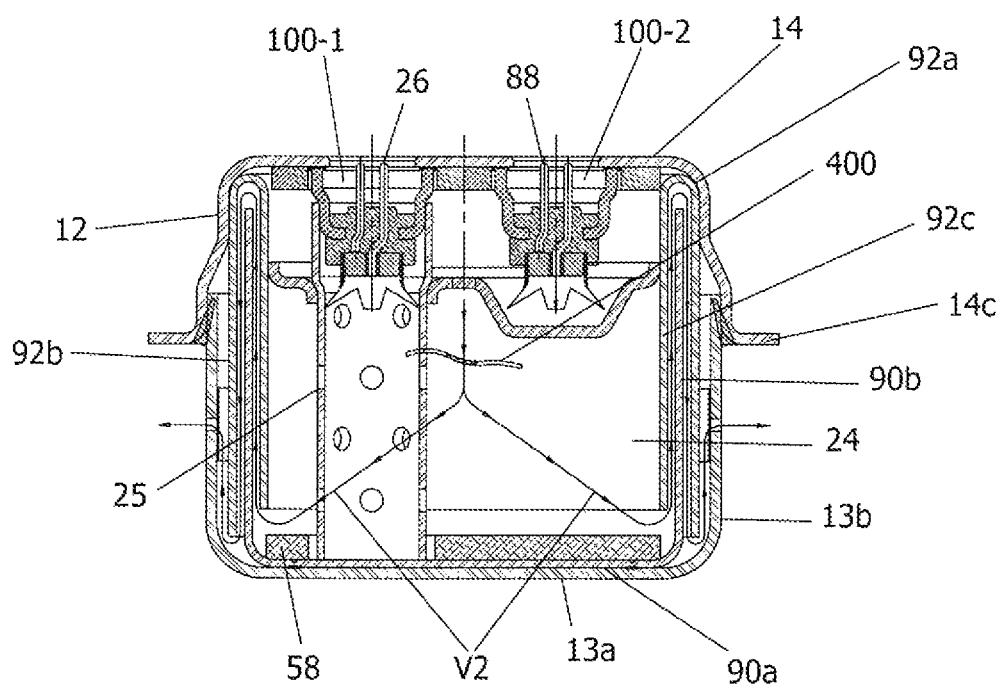
FIG. 4 is the view of FIG. 2 showing activation and operation of both the primary chamber and a secondary chamber of the gas generating system.
Figure 5:
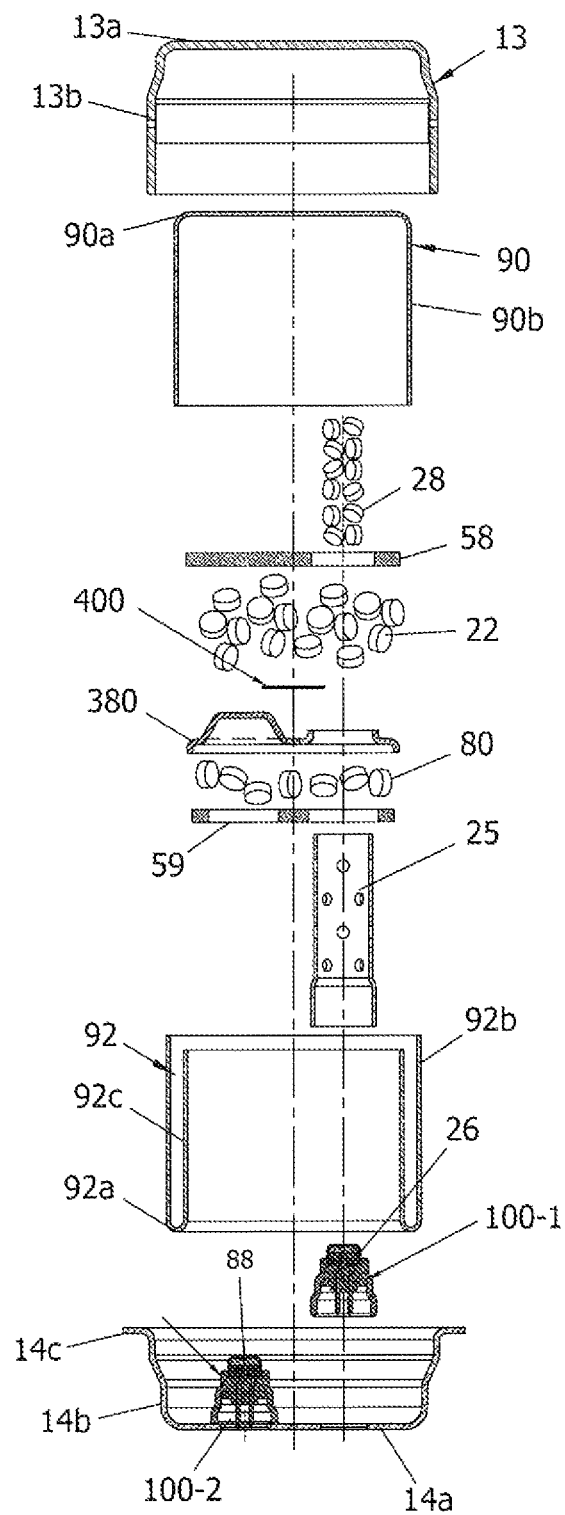
FIG. 5 is an exploded view of the embodiment shown in FIG. 2.

Operation of the embodiments of the gas generating system will now be discussed with reference to FIGS. 3 and 4.

The gas generating system may be operatively coupled to a crash sensor (not shown) used for detecting the occurrence and severity of a crash event. If the sensor determines that the severity of the crash is above some first predetermined threshold level, the crash sensor may convey an activation signal to initiator 26, thereby activating booster propellant 28 in first chamber 24. Referring to FIG. 3, when only primary chamber 24 is to be deployed, by-products resulting from combustion of booster material 28 flow through booster cup openings 27, igniting gas generant 22. The increased pressure in chamber 24 caused by combustion of gas generant 22 causes shims 56 to burst. Inflation gas produced by combustion of the first gas generant then proceeds from chamber 24 into flow passage 300 and along the pathways denoted by arrows V1, flowing sequentially into flow passage first portion 300a, second portion 300b, third portion 300c, and fourth portion 300d, cooling as it flows. The pressurized gas then bursts shims 56 and flows out of housing 12 through openings 20 into an associated airbag or other gas-actuatable device.

The severity of the crash that is detected by the sensor will determine how the airbag or other gas-actuatable device is actuated. Specifically, if the severity of the crash is only above the first threshold level, then only the first chamber 24 will be activated (as just described) to provide gas to actuate the gas-actuatable device. Referring to FIG. 4, however, if the severity of the crash is determined to be above the second threshold level, then both the first chamber 24 and the second chamber 82 will be activated to provide gas to actuate the gas-actuatable device. A signal from the crash sensor is then conveyed to second initiator assembly 100-2, thereby activating the second initiator and igniting second gas generant 80. Inflation gas produced by combustion of the second gas generant 80 then detaches or opens check valve 400 and then proceeds through divider vent opening(s) 380v into chamber 24 and along the pathways denoted by arrows V2, then into flow passage 300 and through openings 20 in housing 12 into an associated airbag or other gas-actuatable device as previously described.

In an operational mode where both of chambers 24 and 82 are deployed simultaneously, the crash sensor conveys simultaneous activation signals to initiator assemblies 100-1 and 100-2, thereby igniting booster propellant 28 and also second gas generant 80. By-products resulting from combustion of booster material 28 flow through booster cup openings 27, igniting gas generant 22. This mode provides simultaneous or overlapping combustion of gas generants 22 and 80.

Figure 7:
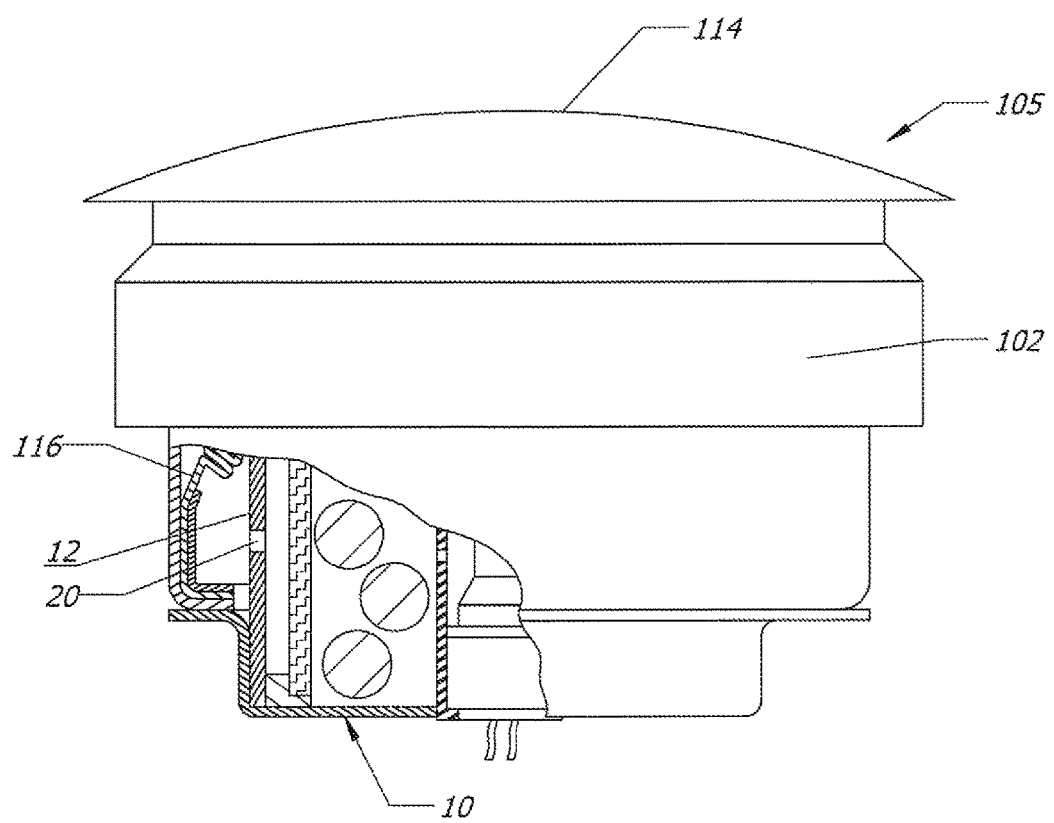
FIG. 7 is a partial cross-sectional side view of a driver-side airbag module incorporating an embodiment of a gas generating system described herein.

FIG. 7 shows a particular application of a gas generating system in accordance with one of the embodiments described above. Referring to FIG. 7, the gas generating system 10 may be incorporated into a driver side airbag module 105. Airbag module 105 comprises a module housing 102 having a rupturable frontal closure 114, an airbag 116, and a gas generating system 10 in accordance with one of the embodiments previously described. An exemplary gas generating system construction suitable for use in airbag module 105 is described in U.S. Pat. No. 6,422,601, incorporated herein by reference. As described above, gas generating system housing 12 contains openings 20 enabling fluid communication with an interior of airbag 116, for effecting discharge of gas produced by gas generants 22 and 80 (not shown in FIG. 5).

Figure 8:
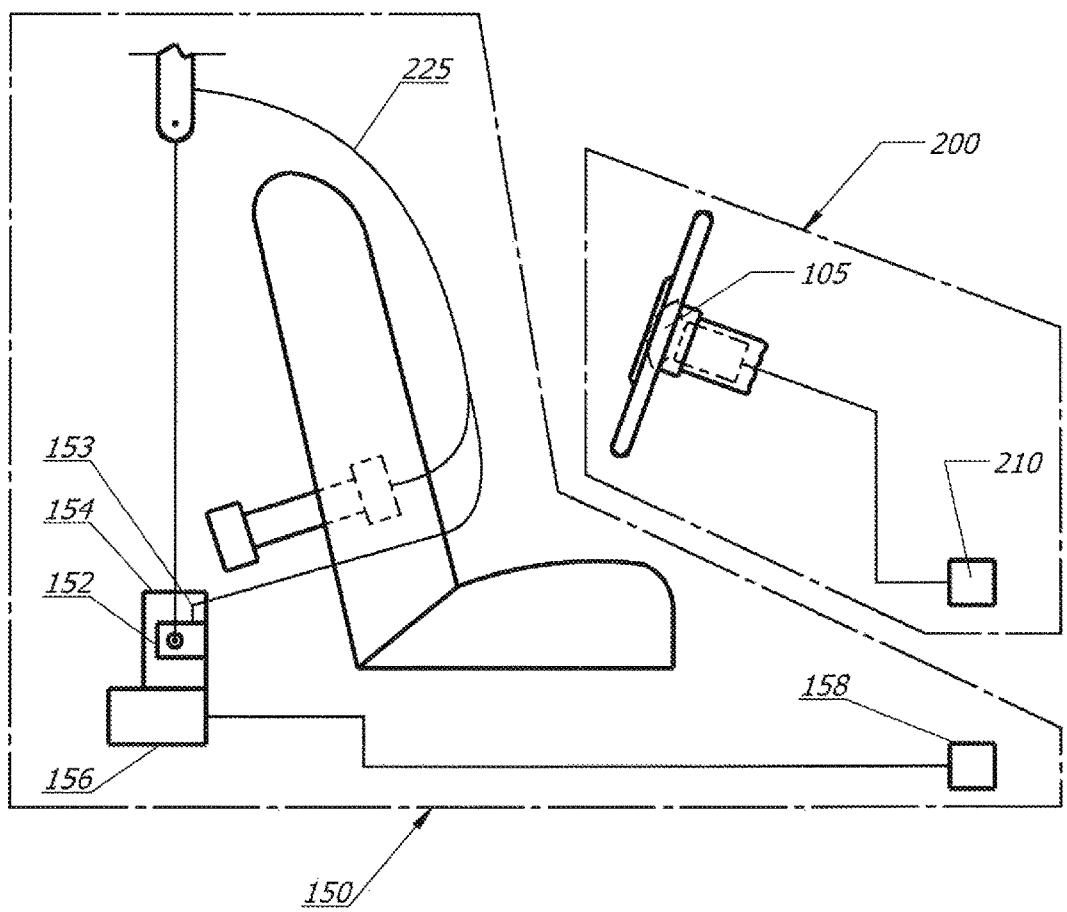
FIG. 8 is a schematic representation of an exemplary vehicle occupant protection system incorporating the gas generating system shown in FIG. 2.

Referring now to FIG. 8, airbag module 105 or any of the gas generating system embodiments described above may be incorporated into a broader, more comprehensive vehicle occupant protection system 180 including additional elements such as, for example, a safety belt assembly 150. FIG. 8 shows a schematic diagram of one exemplary embodiment of such a protection system. Airbag module 105 may be in communication with a crash event sensor 210 which is in communication with a known crash sensor algorithm that signals actuation of airbag module 105 via, for example, activation of initiator assemblies 100-1 and 100-2 in the event of a collision.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic initiator (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. A gas generating system comprising:
 a housing containing a first housing portion comprising a base and a wall extending from said base, and, a second housing portion connected to said first housing portion;
 a monolithic first baffle element positioned within the housing and including a base portion and a wall extending from the base portion in a first direction;
 a second baffle element positioned within the housing and including a base portion, a first wall extending from the base portion in a second direction, and a second wall extending from the base portion in the second direction,
 wherein the first baffle element wall extends between and is spaced apart from the second baffle element first and second walls.

2. The system of claim 1 further comprising a divider secured to the second baffle element second wall so as to divide an interior of the housing into a first chamber and a second chamber.

3. The system of claim 1 wherein the second direction is opposite the first direction.

4. The system of claim 1 wherein a spacing between the first baffle element wall and the second baffle element first wall is constant.

5. The system of claim 1 wherein a spacing between the first housing portion wall and the second baffle portion second wall is constant.

6. The system of claim 1 wherein the second baffle element base portion is in the shape of a half-torus.

7. The system of claim 1 wherein the second baffle element first and second walls extend from the second baffle element base portion so as to define an annular cavity between the walls.

8. The system of claim 7 wherein a spacing between the second baffle element first and second walls is constant.

9. The system of claim 1 wherein the first baffle element wall and the second baffle element first and second walls extend parallel to each other.

10. The system of claim 1 wherein the first baffle element base portion is in intimate thermal contact with the housing.

11. The system of claim 1 wherein the first housing portion is monolithic and has a base portion and a cylindrical wall extending from a periphery of the base portion, and wherein the first baffle element base portion is in intimate thermal contact with the first housing portion base.

12. The system of claim 1 wherein a spacing between the first housing portion wall and the first baffle element wall is constant.

13. A vehicle occupant protection system including a gas generating system in accordance with claim 1.

14. A vehicle including a gas generating system in accordance with claim 1.

15. A gas generating system comprising:
 a housing;
 a first baffle element positioned within the housing and including a base portion and a wall extending from the base portion in a first direction;
 a second baffle element positioned within the housing and including a base portion, a first wall extending from the base portion in a second direction, and a second wall extending from the base portion in the second direction; and
 a divider secured to the second baffle element second wall so as to divide an interior of the housing into a first chamber and a second chamber,
 wherein the first baffle element wall extends between and is spaced apart from the second baffle element first and second walls.

* * * * *